April 10, 1928.
L. H. NOAH
1,665,672
PISTON AND CONNECTING ROD CONSTRUCTION
Filed March 22, 1927
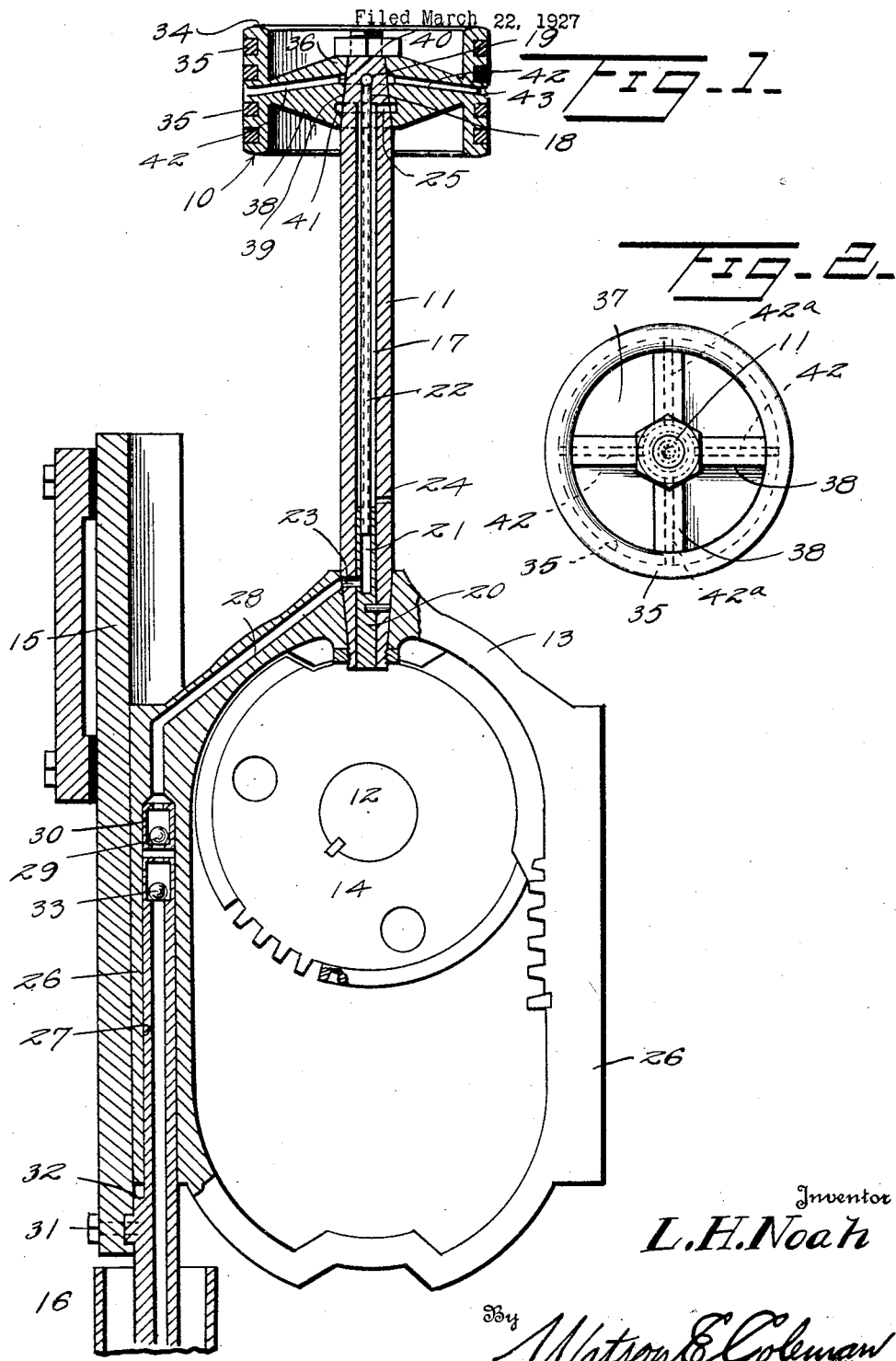
Inventor
L. H. Noah
By Watson E. Coleman
Attorney Patented Apr. 10, 1928.

1,665,672

UNITED STATES PATENT OFFICE.

LEROY H. NOAH, OF OGALLAH, KANSAS.

PISTON AND CONNECTING-ROD CONSTRUCTION.

Application filed March 22, 1927. Serial No. 177,381.

This invention relates to piston and connecting rod constructions and more particularly to an improvement of the structure illustrated in my prior application, Serial No. 104,413, filed April 24, 1926, for piston and connecting rod constructions.

In the application above identified, I disclose a piston for internal combustion engines and the like having a fixed rod through which a rack mechanism is reciprocated. The reciprocation of this rack mechanism is transformed to rotation of a driven shaft. The principal feature of the construction illustrated in the application is the provision of means for insuring a positive circulation of lubricating oil through the rod to the piston. The stem illustrated, however, is limited in its use to structures wherein the lower end of the rod and yoke connection carried thereby may extend into a body of oil provided for lubrication. An important object of the present invention is the elimination of that feature of the construction rendering it necessary that the yoke actually extend into the body of oil.

A further object of the invention is to provide an improved structure whereby the oil is conducted through the rod to the piston.

A still further object of the invention is to improve the actual structure of the piston employed, so that the same may be reduced in weight and at the same time the lubricating features thereof retained.

These and other objects I attain by the construction shown in the accompanying drawings, wherein for the purpose of illustration is shown a preferred embodiment of my invention and wherein:—

Figure 1 is a vertical sectional view through a piston and yoke structure embodying lubricant distributing apparatus constructed in accordance with my invention;

Figure 2 is a plan view of the piston.

Referring now more particularly to the drawings, the numeral 10 generally designates a piston rigidly secured to one end of a rod 11, the opposite end of which is operatively connected to a shaft 12 through a yoke 13 and coacting interrupted gear mechanisms carried by the yoke and disk 14 secured to the shaft. The numeral 15 generally designates a guide within which the yoke 13 operates and 16 an oil reservoir arranged beneath the yoke.

The rod 11 has an axial bore 17, the upper end of which is reduced, as indicated at 18, the reduction of the bore communicating with a transversely extending port 19. The bore 17 opens at its lower end through the lower end of the rod 11 and is closed at this end of the rod by a plug 20 having a bore 21 opening through its inner end only, which is of the same size as the reduced portion of the bore, indicated at 18. A tube 22 has its ends engaged in the bore 21 of the plug and the reduced portion 18 of the bore. Through the side wall of the piston rod and through the wall of the plug adjacent the lower end of the bore 21 thereof, a port 23 is formed through the wall. Through the wall of the piston rod immediately above the upper end of the plug, a second port 24 is formed. At the upper end of the bore 17, a port 25 is likewise formed through the wall of the piston rod.

The yoke 13 embodies side members 26, one of which, in accordance with my invention, is formed with a bore 27 opening through the lower end thereof. The upper end of this bore is in communication with the port 23 of the piston rod through a duct 28 and at the upper end of the bore 27, a check valve 29 and cage 30 therefor are provided. The check valve 29 closes toward the lower end of the bore 27. Secured to the guide 15, as at 31, and slidable in the bore 27, is a tube 32, the lower end of which extends in the oil reservoir 16 and the upper end of which is provided with a downwardly seating ball check 33.

It will be obvious that as the yoke 13 reciprocates, the tube 32 will operate as a piston. The tube 32 with the ball checks 33 and 29 provides a pump, by means of which oil will be forcibly drawn from the reservoir 16 and discharged into the duct 28 and so conducted through the port 23, bore 21, tube 22 to the port 19 of the connecting rod. The piston employed preferably comprises an annular wall 34 mounting the usual compression rings 35 and a central hub 36, with which the upper end of the piston rod is engaged. The hub 36 is connected with the annular wall 34 by a web 37 perpendicular to this annular wall and by vertically extending ribs 38, which are preferably four in number. The piston rod receiving bore 39 of the hub is formed with a pair of annular grooves 40 and 41 communicating with the ports 19 and 25 of the piston rod, respectively. The diametrically opposed ribs 38 have ducts 42 connecting the groove 40 with a peripheral groove 43 formed in the annular wall 34 of the piston at diametrically opposed points. The remaining ribs have ducts 42ª connecting the groove 41 with the groove 43. It will be obvious that during reciprocation of the piston, the pump mechanism will discharge oil through the port 19 to the groove 40 and through the ducts 42 to the groove 43. Passing about the piston through this groove 43, the oil will pass into the ducts 42ª, through these ducts to the port 25, bore 17 and port 24 of the piston rod, from which latter point, it passes to the base of the engine for collection in the reservoir 16.

Since the construction hereinbefore set forth is capable of a certain range of change and modification without materially departing from the spirit of the invention, I do not limit myself to such specific structure except as hereinafter claimed.

I claim:—

In combination, a piston comprising an annular wall having a groove formed intermediate its ends, a hub having a rod receiving bore, a web perpendicular to the annular wall connecting the annular wall and hub, ribs connecting said hub and annular wall, the rod receiving bore of the hub having annular grooves formed therein, lugs connecting the groove of the annular wall with the grooves of the hub and extending through said ribs, a rod engaged with said hub and having ports communicating with the grooves thereof, said rod having a bore the upper end of which is reduced and communicates with one of said ports, a plug seated in the lower end of the bore, said plug having a bore of the same size as the reduced extension of the first named bore, a tube having its ends engaged in said reduced extension and the bore of the plug and means for conducting lubricant to the bore of the plug, the other of said ports connecting the bore of the rod with the second groove of the piston hub, the lower end of the bore having an outlet formed through the wall thereof.

In testimony whereof I hereunto affix my signature.

LEROY H. NOAH.